(12) United States Patent
Harres et al.

(10) Patent No.: US 7,050,665 B2
(45) Date of Patent: May 23, 2006

(54) BIDIRECTIONAL, CO-LOCATED LASER AND DETECTOR

(75) Inventors: Daniel N. Harres, Belleville, IL (US); Samuel I. Green, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 10/788,987

(22) Filed: Feb. 27, 2004

(65) Prior Publication Data

US 2005/0191011 A1    Sep. 1, 2005

(51) Int. Cl.
*G02B 6/12*    (2006.01)
*H04B 10/00*    (2006.01)

(52) U.S. Cl. .............................. 385/14; 385/88; 385/89; 385/92; 385/94; 398/67; 398/72; 398/82; 398/139

(58) Field of Classification Search ................... 385/14, 385/88, 89, 92, 93, 94; 398/67, 72, 82, 139
See application file for complete search history.

(56) References Cited

U.S. PATENT DOCUMENTS

| 4,292,512 | A | * | 9/1981 | Miller et al. | 250/205 |
| 4,493,113 | A | * | 1/1985 | Forrest et al. | 398/139 |
| 4,577,209 | A | * | 3/1986 | Forrest et al. | 257/432 |
| 4,709,413 | A | * | 11/1987 | Forrest et al. | 398/139 |
| 5,118,185 | A | * | 6/1992 | Courten | 356/139.03 |
| 5,347,605 | A | * | 9/1994 | Isaksson | 385/92 |
| 5,392,370 | A | * | 2/1995 | Gryk | 385/25 |

* cited by examiner

*Primary Examiner*—Brian M. Healy
(74) *Attorney, Agent, or Firm*—Black Lowe & Graham, PLLC

(57) ABSTRACT

Bi-directional optical signal transmission apparatus and methods are disclosed. In one embodiment, an optical detector is configured to receive an optical signal from an end of an optical fiber. An optical element is located at the detector surface and is configured to receive and direct a laser beam. A laser beam is directed by the optical element through the end into the optical fiber substantially parallel with the principal axis.

36 Claims, 6 Drawing Sheets

BIDIRECTIONAL, CO-LOCATED LASER AND DETECTOR

FIELD OF THE INVENTION

This invention relates generally to optical transmission along fiber optic conduits and, more specifically, to optical data transmission.

BACKGROUND OF THE INVENTION

Most modern point-to-point optical communication links require that nodes communicate in both directions, as shown in FIG. 1a. In this example, a bidirectional communication installation 12 facilitates bidirectional communication between a first transceiver 21a and a second transceiver 21b. A first discrete optical fiber 36a carries a signal from a first transmitter 24a to a first receiver 27a, and a second discrete optical fiber 36b carries a signal in the opposite direction from a second transmitter 24b to a second receiver 27b. To communicate between the first transceiver 21a and the second transceiver 21b, each of the optical cables 36a, 36b require optical connectors 42 for each bulkhead 45 they pass through.

In general, optical connectors 42, contacts within the connectors, and cable represent a substantial part of the cost of a fiber optic link (typically greater than 50% of link cost). They also constitute the least reliable components within the link, in part because connectors are intended to be de-mated, allowing contamination, and in part, because these components (in particular the cables) are exposed to maintenance-induced failure due to their accessibility within equipment bays, etc. Thus, any scheme that allows both signal paths, the incoming signal 33 and the outgoing signal 30 (FIG. 1a), to be combined over a single fiber substantially reduces cost and improves reliability (e.g. there are half as many connectors and half as many cable segments to go bad). There are several techniques that have been used to accomplish this bidirectional transmission, each with disadvantages.

A first alternate installation scheme 15 is to use an optical coupler 36f to combine the signals 30, 33 on a single optical fiber 36 strung between the first transceiver 21a and the second transceiver 21b, as shown in FIG. 1b. The optical coupler 36f in the first alternate installation scheme 15 may be a fused bi-conic tapered coupler with the cores of single optical fiber 36 and the second optical fiber 36d in intimate contact with one another. One object of the first alternate installation 15 is accomplished in that the number of optical connectors 42 through the bulkheads 45 is decreased by a factor of two.

One disadvantage of this first alternate installation 15 is that half of the light from the transmitter (assuming a 50–50 coupler) is lost before it makes its way to the single optical fiber 36 through the bulkheads 45 at the connectors 42 because half the light is coupled into an unused fourth port 36e. There is a further loss at the other receiving end of the single optical fiber 36, where half the light is coupled into the transmitter 24b rather than the receiver 27a. As a result, a theoretically perfect link will exhibit a 6dB loss from transmitter 24a to receiver 27a just because of these couplers 36f. It is desirable in most links to avoid this very large loss.

A second alternate installation 18 includes use of two discrete wavelengths 51, 54, as shown in FIG. 1c. The use of dichroic (two-color) filters 57a, 57b (sometimes called dichroic mirrors) is just one of many possible approaches but is the most straightforward schematically and is used here to describe the general approach. The transmitter 24a at the first transceiver 21a creates light 51 with wavelength of $\lambda_1$. The filter at this node transmits light 51 at $\lambda_1$ but reflects light 54 at $\lambda_2$. Incoming light 54 carrying an incoming signal 33 with wavelength $\lambda_2$ is routed to the receiver 27b along the fiber 37. Similarly, the right-hand node dichroic filter 57b transmits light 54 at wavelength $\lambda_2$ carrying an outgoing signal 30 but reflects light 51 at wavelength $\lambda_1$. Alternatively, fibers 30 and 37 may be replaced by free space illumination from the transmitter 24a and to the receiver 27b without affecting this example.

There are several disadvantages to the second alternate installation 18. Principal among these is the fact that light 54 returning from reflections on the single optical fiber 36 is transmitted entirely back to the transmitter 24b of origin. This may be disadvantageous as it can cause laser instability. In addition, the transceivers 21a, 21b at the two ends of the link are unique from one another. In FIG. 1c, the transmitter 24a on the left-hand side emits light 51 at wavelength $\lambda_1$ but the transmitter 24b on the right-hand side emits light 54 at wavelength $\lambda_2$. Likewise, the receivers 27a, 27b operate at different wavelengths. Finally, as systems increasingly make use of multiple wavelengths, it is important to keep in mind that this scheme halves the number of wavelengths available for information carrying. Notably, although this approach is conceptually simple, dichroic filters 57a, 57b are costly and that cost may drive the cost of the installation.

Therefore, a need exists for bidirectional optical signal transmission apparatus and methods that at least partially mitigate the above-noted disadvantages in an economical manner.

SUMMARY OF THE INVENTION

The present invention is directed to bi-directional optical signal transmission apparatus and methods. Embodiments of bi-directional optical signal transmission apparatus and methods in accordance with the present invention may advantageously reduce the number of connections and the length of fiber by half, reduce the installation cost of fiber optic cable plant by half, provide for automatic diagnostics in the form of an In-Service Optical Time Domain Reflectometer, and provide these capabilities while allowing simultaneous communication in both directions with the same wavelength of light.

In one embodiment, an optical detector in accordance with the invention is configured to receive an optical signal from an end of an optical fiber and defines an optical element. The end has a principal axis and a radius. The optical element is located within the radius and configured to receive and direct a laser beam. A laser beam is directed through the optical element into the end into the optical fiber substantially parallel with the principal axis. The optical signal detector may be located at an end of an optical fiber, thereby enabling bidirectional signal communication over the fiber.

It will be appreciated that the features, functions, and advantages can be achieved independently in various embodiments of the present invention, or may be combined in yet other embodiments, as described more fully below.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to bi-directional optical signal transmission apparatus and methods. Many specific details of certain embodiments of the invention are set forth in the following description and in FIGS. 2–6 to provide a thorough understanding of such embodiments. One skilled in the art, however, will understand that the present invention may have additional embodiments, or that the present invention may be practiced without several of the details described in the following description.

By way of overview, in one embodiment, an optical detector is configured to receive an optical signal from an end of an optical fiber and defines an optical element. The end has a principal axis and a radius. The optical element is located within the radius and configured to receive and direct a laser beam. A laser beam is directed through the end of the optical element and into the optical fiber substantially parallel with the principal axis.

Figure 1A:
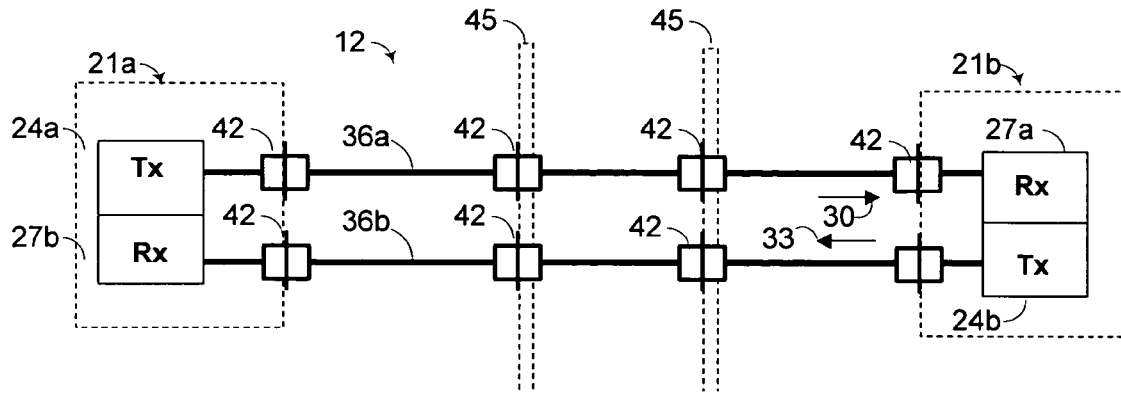
FIG. 1a is a schematic diagram of a prior art bidirectional fiber optical cable installation.
Figure 1B:
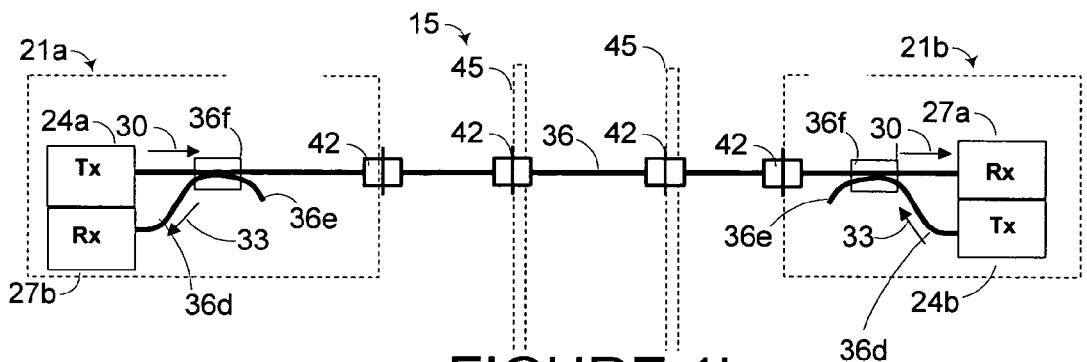
FIG. 1b is a schematic diagram of a first alternative prior art bidirectional fiber optical cable installation.
Figure 1C:
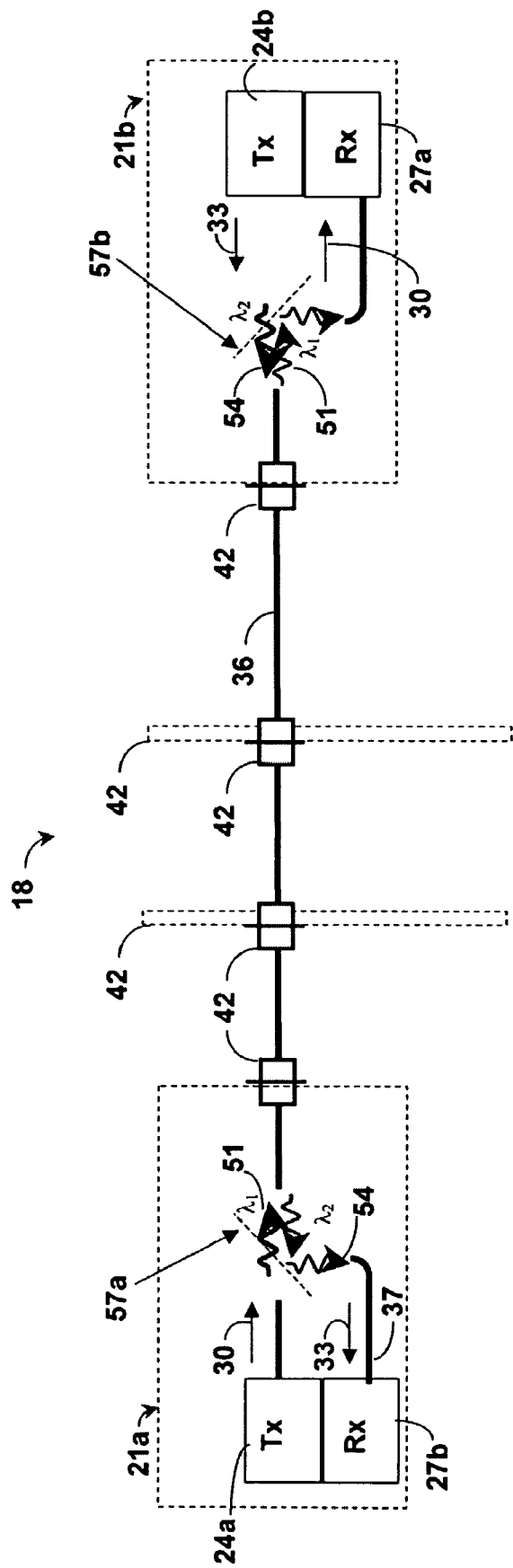
FIG. 1c is a schematic diagram of a second alternative prior art bidirectional fiber optical cable installation.
Figure 2:
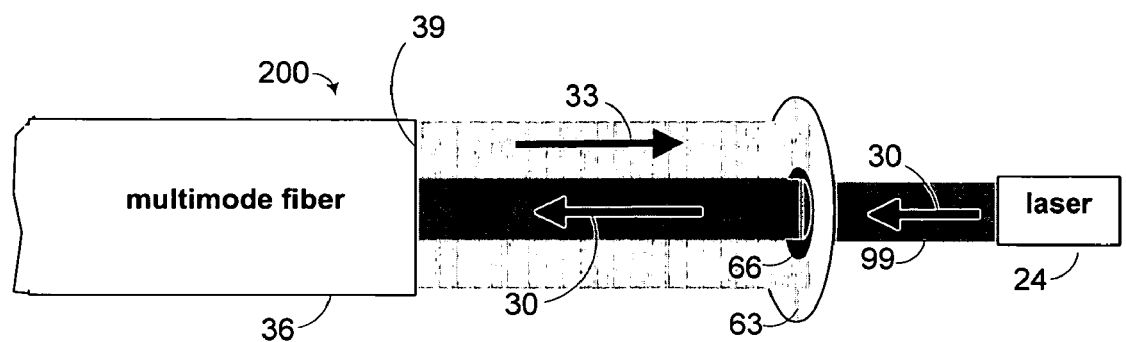
FIG. 2 is a cut-away diagram of an optical system including a detector having an optical port on a major axis of an optical fiber in accordance with an embodiment of the invention.

FIG. 2 is a schematic of an optical system 200 that includes an optical signal detector 63 in accordance with an embodiment of the present invention. The optical system 200 includes a laser 24 operatively positioned on a first side of the optical signal detector 63, and a multimode fiber 36 positioned on a second side of the optical signal detector 63. In this embodiment, the optical signal detector 63 defines an optical port 66. As shown in FIG. 2, a laser beam 99 generated by the laser 24 passes through the optical port 66 in the optical signal detector 63 en route to the multimode fiber 36. As described more fully below, the optical signal detector 63 advantageously detects an incoming signal 33, and may also allow capture of approximately all of the laser beam 99 (save for a small Fresnel reflection that always occurs at laser/fiber interface, unless minimized by well-known means). Thus, the inventive optical signal detector 63 may provide an insertion loss penalty that may be nearly zero.

Modem semiconductor lasers can launch their power into areas with diameters smaller than 10 μm. Because the light traveling from a 62.5 μm-core multimode fiber has a waist that is approximately 62.5 μm, allowing the optical port 66 to be relatively small (for example, diameter 20 μm), and thus, will not significantly compromise the performance of the detector 63. Outgoing signals 30 pass out of the laser 24 and into the optical fiber 36, while incoming signals 33 pass out of the optical fiber 36 and are detected at the detector 63.

With continued reference to FIG. 2, for the light carrying the incoming signal 33 from the fiber 36 that is detected at the detector 63, there is a loss of energy due to the area of port 66 and its placement at the detector 63 center. If the light energy were uniformly distributed across the surface of an end 39 of the fiber 36 such that the light energy shining on the detector 63 was uniform across the surface, and if the port 66 is configured with a 20 μm diameter, with the fiber 36 having a diameter of approximately 62.5 μm, then the loss that will occur due to light going back through the port 66 and missing the detector 63 is given by:

$$\text{loss (dB)} = 10\log\left(1 - \frac{\pi R_1^2}{\pi R_2^2}\right) = 10\log\left[1 - \left(\frac{20}{62.5}\right)^2\right] = 0.5 \text{ dB} \quad (1)$$

where R1 is the hole diameter and R2 is the incoming beam waist diameter or optimally, the diameter of the fiber 36.

In practice, however, light energy distributions across the face of a multimode fiber 36 are rarely uniform, particularly when the source is a laser transmitter 24 or a graded index fiber. Instead, the light energy tends to be distributed in a manner that concentrates the light intensity at the center of the fiber 36. A Gaussian distribution is a closer approximation of the distribution of light energy across the surface of the end 39. Assuming a Gaussian distribution, placing the port 66 at the center of the detector 63, coinciding with the center of the end 39 and the maxima of energy distribution, increases the loss due to the presence of the port 66. The approximate energy loss to the detector 63 may be on the order of 1 dB.

Figure 3:
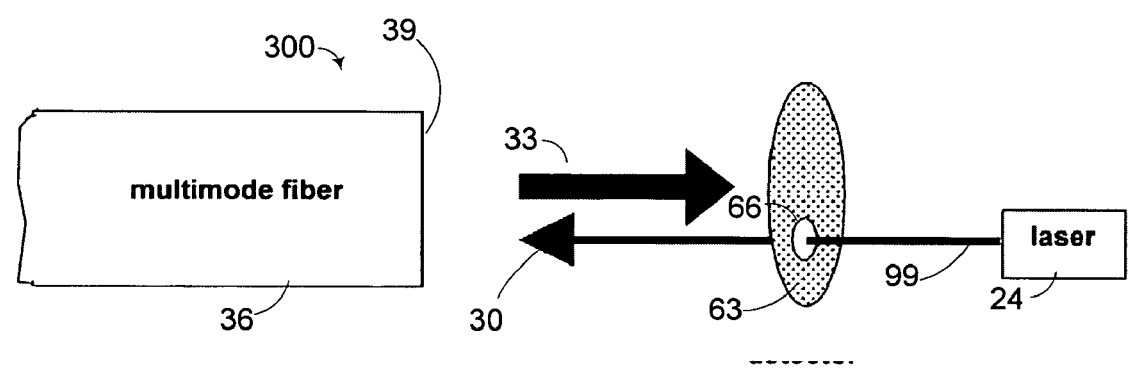
FIG. 3 is a cut-away diagram of an optical system including a detector having an optical port off the major axis of the optical fiber in accordance with another embodiment of the invention.

FIG. 3 is a cut-away diagram of an optical system 300 including a detector 63 having an optical port 66 off the major axis of the optical fiber 36 in accordance with another embodiment of the invention. Because the port 66 is offset from the center of the detector 63, the loss of light energy from the fiber 36 to the detector 63 is greatly reduced, improving reception of the incoming signal 33 without compromising the ability to receive the whole of the laser beam 99 from the transmitter 24 carrying the outgoing signal 30.

The performance of the detector 63 defining a port 66 may be adversely impacted by additional dark current. Thermal dark current in the absence of light degrades most light-sensitive detectors 63 and would increase because of surface states caused by the presence of the aperture within the sensitive region, so an aperture is a good example but not a good idea.

FIG. 4a shows an optical system 400 including an elliptical-shaped detector 63 placed at an oblique angle to the beam from the end 39 of a fiber 36.

Figure 4:
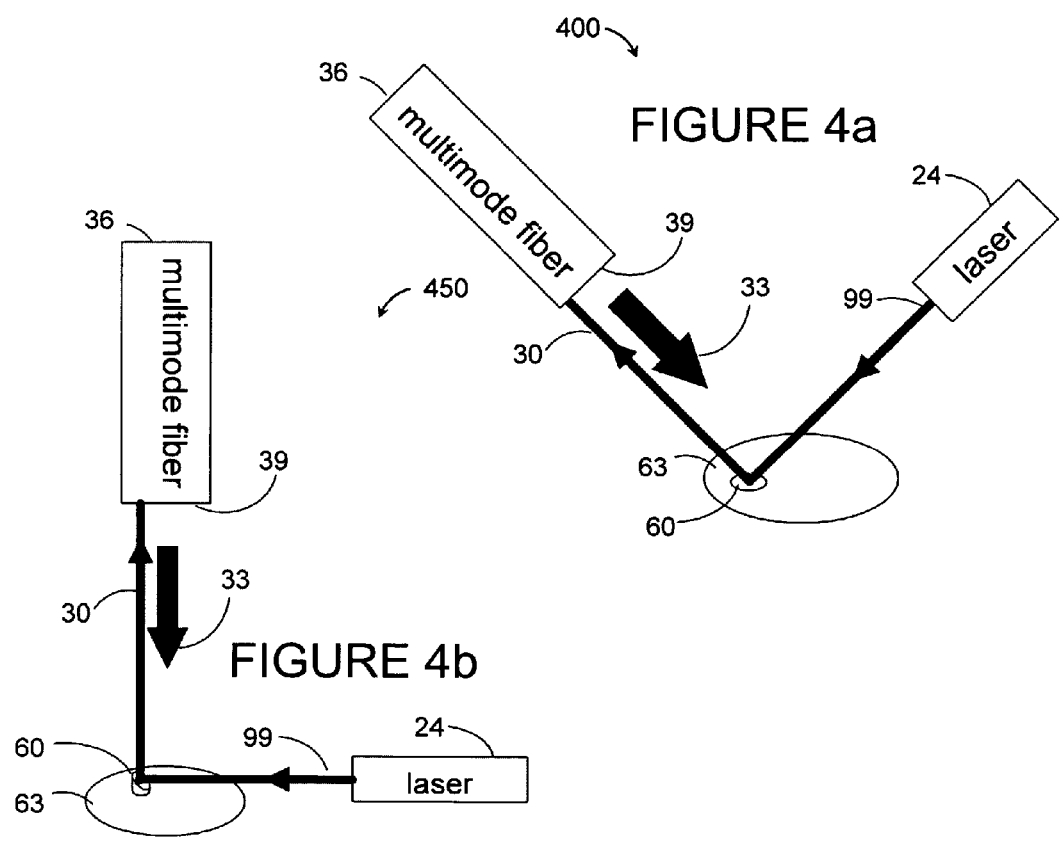
FIG. 4a is a cut-away diagram of an optical system including an obliquely illuminated detector incorporating a smaller mirrored portion off the major axis of the optical fiber in accordance with yet another embodiment of the invention.
FIG. 4b is a cut-away diagram of an optical system including a detector incorporating an angled mirror off the major axis of the optical fiber in accordance with still another embodiment of the invention.

Note that FIGS. 3 and 4 show only the core of the optical fiber.

In this embodiment, a transmitter 24 shines a laser beam 99 onto the mirror 60 to reflect the beam 30 into the end of the optical fiber 36. The light energy in the incoming signal 33 is spread across a greater surface area of the detector 63 resulting in a nearly total absorption of energy except for the received energy hitting the mirror 60, which is wasted. Rather than a port 66, the laser beam 99 from the transmitter 24 is trained on a mirror 60 on the surface of the detector 63. Advantageously, the mirror 60 may readily be formed on the detector 63 by evaporating a metallic surface overlaying the semiconductor substrate making up the detector 63, and then masking the surface during etching, though other alternative means will also serve.

FIG. 4b shows another embodiment of an optical system 450 that also uses a mirror 60 mounted on the detector 63 to redirect a laser beam 99 into an optical fiber 36.

Figure 5:
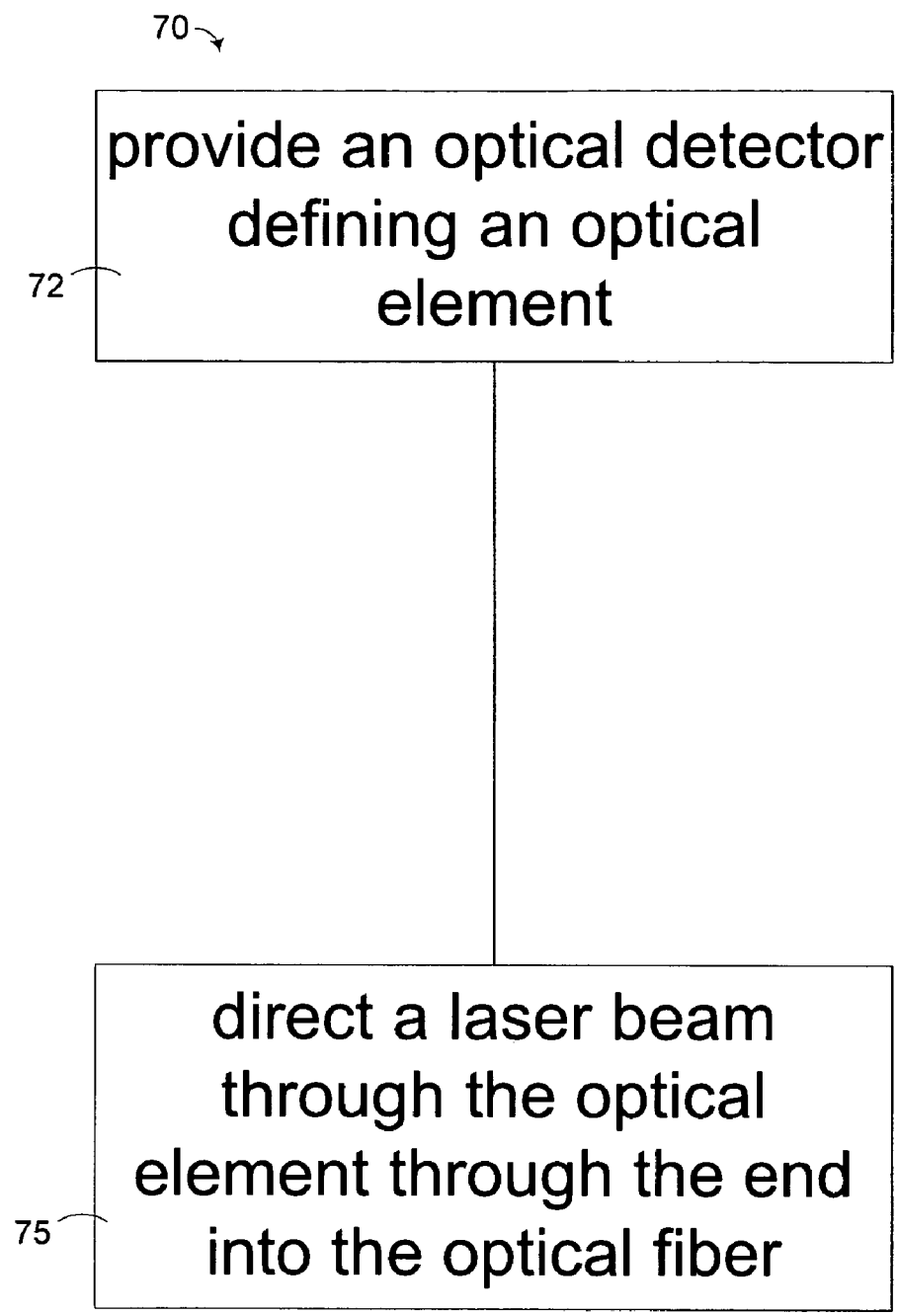
FIG. 5 is a flow chart of a method of bidirectional optical signal transmission in accordance with an embodiment of the invention.

FIG. 5 is a flow chart of a method 70 of bidirectional optical signal transmission in accordance with an embodiment of the invention. As described above with reference to FIGS. 2, 3, 4a, and 4b, the method 70 includes providing an optical detector 63 at a block 72. The optical detector 63 is configured to receive an optical signal 33 emitted from an end 39 of the optical fiber 36, and also defines an optical element 66 or 60 in the detector 63 to admit or to direct a laser beam 99. The optical element might be a simple port that allows optical signals to pass through the detector (e.g. FIGS. 2–3), or may be any other suitable optical element, such as a mirror, a bifurcating mirror, a prism, a lens, a diffraction grating, an etalon, or a Brewster plate, so long as it may be positioned to direct the laser beam 99 into the end 39 of the optical fiber 36 along the principal axis of the fiber 36.

As discussed above, the optical element 66 or 60 may be located to propagate a laser beam 99 efficiently into an end 39 while minimally detracting from the efficiency of the detector 63 by occluding as little of the laser beam 99 as it leaves the optical fiber 36.

At a block 75, the laser beam 99 may be directed through the optical element 66 or 60 through the end 39 of the optical fiber 36 substantially parallel with the principal axis. The resulting outgoing signal 33 may then pass along the same path as the incoming signal 30, enabling bidirectional communication.

Embodiments of bidirectional optical signal transmission apparatus and methods in accordance with the present invention may provide significant advantages over prior art apparatus and methods. For example, the number of connections and the length of fiber may be reduced by up to one half, causing a corresponding reduction in the installation cost of fiber optic cable plant. Similarly, embodiments of apparatus and methods in accordance with the present invention may advantageously allow for automatic diagnostics in the form of fiber optic links having a built-in test as disclosed, for example, in co-pending, commonly-owned U.S. patent application Ser. No. 10/644,124 filed on Aug. 20, 2003, or an in-service optical time domain reflectometer as disclosed, for example, in co-pending, commonly-owned U.S. Patent Application (undetermined), filed under on (undetermined), which applications are incorporated herein by reference. Finally, apparatus and methods in accordance with the present invention may provide these capabilities while allowing simultaneous communication in both directions with the same wavelength of light.

Figure 6:
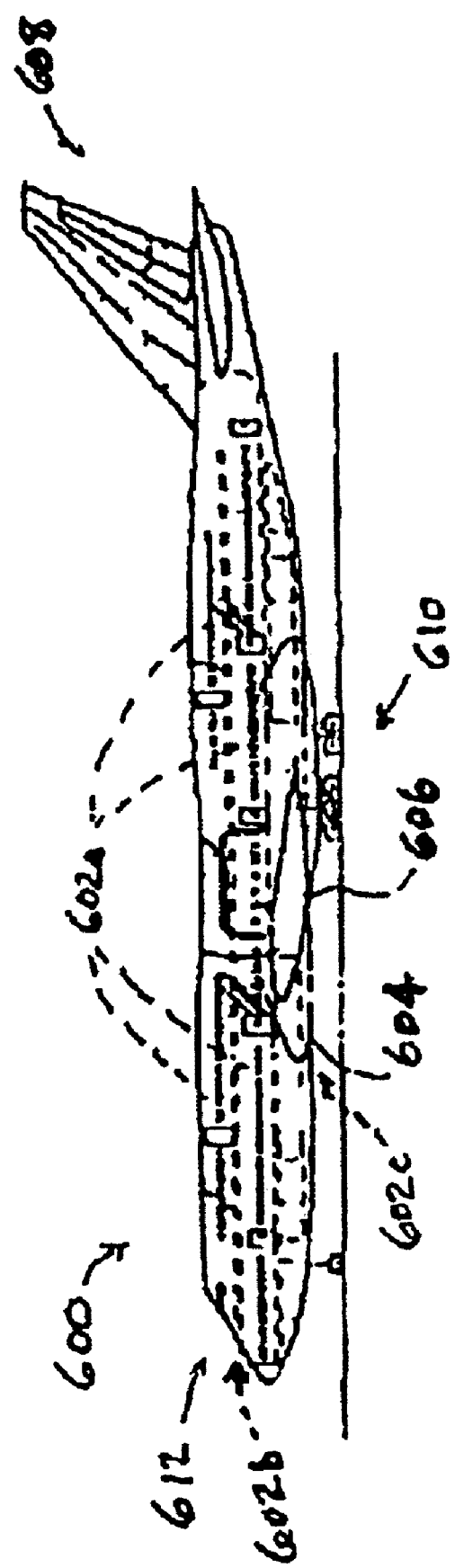
FIG. 6 is a side elevational view of an aircraft 600 having one or more optical systems in accordance with embodiments of the present invention.

It will be appreciated that a wide variety of apparatus may be conceived that incorporate optical systems that include apparatus and methods in accordance with various embodiments of the present invention. For example, FIG. 6 is a side elevational view of an aircraft 600 having one or more optical systems 602 in accordance with embodiments of the present invention. In general, except for the various optical systems 602, the various components and subsystems of the aircraft 600 may be of known construction and, for the sake of brevity, will not be described in detail herein.

As shown in FIG. 6, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. The aircraft 600 shown in FIG. 6 is generally representative of a commercial passenger aircraft, including, for example, the 737, 747, 757, 767, and 777 models commercially-available from The Boeing Company of Chicago, Ill. The inventive apparatus and methods disclosed herein, however, may also be employed in any virtually any other types of aircraft. For example, the teachings of the present invention may be utilized in other types of passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

More specifically, the aircraft 600 may include one or more embodiments of optical systems 602a in accordance with the present invention incorporated into the flight control system 612, or into optical control systems 602c for controlling the propulsion units 604, including, for example and not by way of limitation, the optical systems generally disclosed in U.S. Pat. No. 5,809,220 issued to Morrison et al., U.S. Pat. No. 6,369,897 B1 issued to Rice et al., U.S. Pat. No. 6,266,169 B1 issued to Tomooka et al., U.S. Pat. No. 5,653,174 issued to Halus, U.S. Pat. No. 5,295,212 issued to Morton et al., U.S. Pat. No. 5,222,166 issued to Weltha, and U.S. Pat. No. 5,119,679 issued to Frisch. Clearly, a wide variety of optical systems 602 in accordance with embodiments of the present invention may be conceived for incorporation into the various subsystems of the aircraft 600.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for bidirectional optical signal transmission through an optical fiber having a principal axis, the method comprising:

providing an optical detector in optical communication with an end of the optical fiber, the optical detector being configured to receive an optical signal from the end of the optical fiber and defining an optical element, the optical element being located at least partially within a radius of the end and configured to receive and direct an optical energy and defining a mirror disposed on a surface of the optical detector; and directing the optical energy onto the optical element and toward the end of the optical fiber substantially parallel with the principal axis of the optical fiber.

2. The method of claim 1, wherein providing an optical detector includes providing an optical detector engaged with an end of the optical fiber.

3. The method of claim 1, wherein providing an optical detector defining an optical element includes providing an optical detector defining an optical port disposed therethrough.

4. The method of claim 1, wherein directing the optical energy onto the optical element includes directing a laser beam onto the optical element.

5. The method of claim 1, wherein providing an optical detector defining an optical element includes providing an optical detector defining an optical port disposed therethrough, and wherein directing the optical energy onto the optical element includes directing the optical energy through the optical port.

6. The method of claim 1, wherein providing an optical detector in optical communication with an end of the optical fiber and defining an optical element includes providing an optical detector in communication with the end defining a mirror disposed on a surface of the optical detector.

7. The method of claim 1, wherein providing an optical detector in optical communication with an end of the optical fiber and defining an optical element includes providing an optical detector spaced apart from an end of the optical fiber.

8. The method of claim 1, wherein providing an optical detector defining an optical element includes providing an optical detector defining an optical element disposed at an intersection of the principal axis with the detector.

9. The method of claim 1, wherein the detector defines the optical element, such that the principal axis does not intersect the optical element.

10. The method of claim 1, wherein the optical element includes at least one of a diffraction grating, a Brewster plate, an etalon, a prism, and a lens.

11. An optical component, comprising:
a detector adapted to be positioned in optical communication with an end of an optical fiber and configured to receive an optical signal from the optical fiber and to generate an electronic signal responsive to the optical signal, the detector defining an optical element positionable at least partially within a radius of the end of the optical fiber, the optical element being configured to receive and direct an optical energy toward the end of the optical fiber and defining a mirror disposed on a surface of the optical detector.

12. The component of claim 11, wherein the detector defines the optical element at an intersection of the principal axis with the detector.

13. The component of claim 11, wherein the detector is further adapted to communicate optically with the end of the optical fiber.

14. The component of claim 11, wherein the optical element comprises an optical port disposed through the detector.

15. The component of claim 11, wherein the optical element is configured to receive and direct a laser beam toward the end of the optical fiber.

16. The component of claim 11, wherein the detector is adapted to be engaged with an end of the optical fiber.

17. The component of claim 11, wherein the detector is adapted to be spaced apart from an end of the optical fiber.

18. The component of claim 11, wherein the optical element includes at least one of a mirror, a diffraction grating, a Brewster plate, an etalon, a prism, and a lens.

19. The component of claim 11, further comprising a transmitter operatively positioned proximate the detector and adapted to transmit the optical energy onto the optical element.

20. The component of claim 11, wherein the transmitter includes a laser.

21. A fiber optic system for bidirectional optical signal transmission, comprising:
an optical fiber including at least one end, the end having a radius through which light passes and a principal axis;
a detector adapted to be positioned at least proximate to the end of the optical, fiber and configured to receive an optical signal from the optical fiber and to generate an electronic signal responsive to the optical signal, the detector defining an optical element positionable at least partially within a radius of the end of the optical fiber, the optical element being configured to receive and direct an optical energy toward the end of the optical fiber and defining a mirror disposed on a surface of the optical detector; and
a transmitter operatively positioned proximate the detector and adapted to transmit the optical energy onto the optical element.

22. The system of claim 21, wherein the detector defines the optical element at an intersection of the principal axis with the detector.

23. The system of claim 21, wherein the detector is further adapted to be engaged into contact with the end of the optical fiber.

24. The system of claim 21, wherein the optical element comprises an optical port disposed through the detector.

25. The system of claim 21, wherein the optical element is configured to receive and direct a laser beam toward the end of the optical fiber.

26. The system of claim 21, wherein the detector is adapted to be engaged proximal to the optical fiber.

27. The system of claim 21, wherein the detector is adapted to be spaced apart from an end of the optical fiber.

28. The system of claim 21, wherein the optical element includes at least one of a diffraction grating, a Brewster plate, an etalon, a prism, and a lens.

29. The system of claim 21, wherein the transmitter includes a laser.

30. An aerospace vehicle, comprising:
a fuselage;
a propulsion system operatively coupled to the fuselage; and
an optical system operatively disposed at least partially within the fuselage, the optical system comprising:
an optical fiber including at least one end, the end having a radius and a principal axis;
a detector adapted to be positioned at least proximate to the end of the optical fiber and configured to receive an optical signal from the optical fiber and to generate an electronic signal responsive to the optical signal, the detector defining an optical element positionable at least partially within a radius of the end of the optical fiber, the optical element being configured to receive and direct an optical energy toward the end of the optical fiber and defining a mirror disposed on a surface of the optical detector; and
a transmitter operatively positioned proximate the detector and adapted to transmit the optical energy onto the optical element.

31. The vehicle of claim 30, wherein the detector defines the optical element at an intersection of the principal axis with the detector.

32. The vehicle of claim 30, wherein the detector is further adapted to be proximal to the end of the optical fiber.

33. The vehicle of claim 30, wherein the optical element comprises an optical port disposed through the detector.

34. The vehicle of claim 30, wherein the detector is adapted to be spaced apart from an end of the optical fiber.

35. The vehicle of claim 30, wherein the optical element includes at least one of a mirror, a diffraction grating, a Brewster plate, an etalon, a prism, and a lens.

36. The vehicle of claim 30, wherein the transmitter includes a laser.

* * * * *

UNITED STATES PATENT AND TRADEMARK OFFICE
CERTIFICATE OF CORRECTION

| | | |
|---|---|---|
| PATENT NO. | : 7,050,665 B2 | Page 1 of 1 |
| APPLICATION NO. | : 10/788987 | |
| DATED | : May 23, 2006 | |
| INVENTOR(S) | : Harres et al. | |

It is certified that error appears in the above-identified patent and that said Letters Patent is hereby corrected as shown below:

Column 1, line 3, add the following paragraph:

STATEMENT OF GOVERNMENT INTEREST

This invention was made with Government support under N00019-04-C-0005 awarded by the United States Navy. The Government has rights in this invention.

Signed and Sealed this

Eighth Day of August, 2006

JON W. DUDAS
*Director of the United States Patent and Trademark Office*